(12) United States Patent
Montagu et al.

(10) Patent No.: US 6,218,803 B1
(45) Date of Patent: Apr. 17, 2001

(54) POSITION SENSING WITH VARIABLE CAPACITANCE TRANSDUCERS

(75) Inventors: Jean I. Montagu, Brookline; Peter Honkanen, Arlington; Nathan K. Weiner, Stoughton, all of MA (US)

(73) Assignee: Genetic Microsystems, Inc., Woburn, MA (US)

( * ) Notice: Subject to any disclaimer, the term of this patent is extended or adjusted under 35 U.S.C. 154(b) by 0 days.

(21) Appl. No.: 09/326,374

(22) Filed: Jun. 4, 1999

(51) Int. Cl.[7] .............................. G01D 5/24; G01D 5/241
(52) U.S. Cl. ............................................. 318/662; 318/652
(58) Field of Search ..................... 318/632, 652, 318/662; 361/287, 289, 292

(56) References Cited

U.S. PATENT DOCUMENTS

| | | | |
|---|---|---|---|
| 3,517,282 | 6/1970 | Miller | 317/249 |
| 3,577,072 | 5/1971 | Miller | 324/60 C |
| 4,142,144 | 2/1979 | Rohr | 324/61 R |
| 4,339,709 | * 7/1982 | Brihier | 324/61 R |
| 4,694,235 | 9/1987 | Flowers | 318/662 |
| 4,864,295 | 9/1989 | Rohr | 340/870.37 |
| 4,918,284 | 4/1990 | Weisz | 219/121.78 |
| 5,077,635 | * 12/1991 | Bollhagen et al. | 361/287 |
| 5,099,386 | 3/1992 | Stokes et al. | 361/298 |
| 5,296,703 | 3/1994 | Tsien | 250/235 |
| 5,400,132 | 3/1995 | Trepagnier | 356/138 |
| 5,633,681 | * 5/1997 | Baxter et al. | 348/373 |
| 5,657,006 | 8/1997 | Kinoshita et al. | |
| 5,671,043 | 9/1997 | Ivers | 356/138 |
| 5,681,990 | * 10/1997 | Hampo et al. | 73/118.2 |
| 5,748,005 | 5/1998 | McCormick et al. | 324/662 |
| 5,844,673 | 12/1998 | Ivers | 356/138 |
| 5,905,350 | 5/1999 | Hofbauer | 318/601 |

FOREIGN PATENT DOCUMENTS

| | | | |
|---|---|---|---|
| 44 14 529 A1 | 10/1994 | (DE) | G01B/7/30 |
| 2 264 784 | 9/1993 | (GB) | G01D/5/24 |

OTHER PUBLICATIONS

Cambridge Technology, Inc.; Model 6880 Optical Scanner, product information; (1998) 109 Smith Place, Cambridge, MA 02138.

Foldvari et al., *Instruments and Control Systems*; "Capacitive Transducers"; pp 11; Nov., 1964.

* cited by examiner

*Primary Examiner*—Bentsu Ro
(74) *Attorney, Agent, or Firm*—Philip L. McGarrigle; Alan B. Sherr; Ivan D. Zitkovsky

(57) ABSTRACT

For enabling precise operation of an oscillating device, such as a galvanometric optical scanner, a capacitive position transducer is provided with strategically located internal capacitive fiducial features that interact with the armature of the transducer beyond the central range of excursion of the transducer, typically beyond the normal operating range of the device. Electric pulses obtained at instants of interaction with the fiducials enable determination of position drift caused e.g. by change in environmental conditions. The pulses can be detected by simple circuits to produce recalibration of the amplitude and null position of the instrument on an automatic or elective basis.

39 Claims, 12 Drawing Sheets

POSITION SENSING WITH VARIABLE CAPACITANCE TRANSDUCERS

BACKGROUND OF THE INVENTION

A galvanometric optical scanner is a limited rotation motor to which a position detector is mounted. Normally the scanner carries a mirror that is used to deflect a beam of light, typically a laser beam. It is common to assemble two such units in series, to deflect light in two orthogonal directions and so address an entire surface. Such a paired unit is commonly referred to as a "two axis scanner" or a "two axis scan head".

Single axis scanners as well as two axis scan heads are used in hundreds of applications, in such categories as laser micro machining, visual communication, artificial extension of vision, material processing, medical procedures, and entertainment.

Frequently, laser scanning is used for extremely precise functions. Examples are satellite to satellite communication, motion picture creation from computer data, silicon microchip repair, laser engraving, and laser guidance for aircraft and missiles. In these and other applications, pointing or tracking precision and stability are critical.

Modern optical scanners are expected to have sub-microradian resolution and stability. The desired stability is frequently equal to the resolution of the instrument, e.g. 1 microradian, over a range of environmental conditions. The critical element that determines these properties is a position sensor, also known as a position transducer, mounted on the shaft of the limited rotation motor. Capacitive transducers are commonly used for such applications and numerous designs have been described, see Miller U.S. Pat. No. 3,517,282 and U.S. Pat. No. 3,577,072, and Foldvari et al, "Capacitive Transducers", *Instruments and Controls Systems*, November, 1964. A modern position transducer is an analog device with low inertia, often less than 1 g.cm$^2$, that can resolve better than 1 microradian with a range over 1 radian. These capacitive transducers are derived from the common variable capacitor in which substrates and movable elements may be made of extremely stable and rigid isotropic materials such as PCB or ceramic material, which are comparatively low in cost. Capacitive angular position transducers are preferred for scanning applications because they have low inertia, very high resolution and very small time constant, as well as being comparatively inexpensive to build.

Despite these features, a major shortcoming is lack of stability. The signal, gain and null pointing of capacitive transducers all drift as a function of temperature, humidity or simply over time. The associated decoding electronics are also analog elements and must use extremely stable components. As the associated electronics employ a few dozen critical elements, the stability of each element needs to be an order of magnitude greater than that of the system. This is rarely achieved and never achieved at low cost of construction and verification.

A high quality optical scanner available from Cambridge Technology Inc., Cambridge, Mass., for instance, has resolution under one microradian but, according to Fadvertisement, has null drift of 10 microradians/deg. C, gain drift of 50 PPM/deg. C and short term uncorrected drift of 8 microradians for units equipped with Automatic Gain Control (AGC).

When good stability is imperative, with stability of the same value as the 1 microradian resolution of the system, construction and verification of the units is very demanding.

A number of techniques have been proposed in efforts to provide compensation to satisfy the need for high stability.

One approach is exemplified by Rohr U.S. Pat. No. 4,864,295 in which, on the mechanical structure of the position sensing transducer, a secondary capacitor is employed for the sole purpose to measure thermal drift and to use the drift value to correct the error in position signal. Commercial transducers have rarely been built this way. Other designs add a number of elements and plates such as guards to obtain similar effects. Stokes et al, U.S. Pat. No. 5,099,386 is an example.

Another corrective method consists of installing in the field of view, at added expense and inconvenience, a number of optical fiducial elements as reference points, which are detected optically and used to recalibrate the capacitive position sensor. The challenge is to detect beam position with the same resolution that is expected from the scanning system. In pointing applications, such fiducial elements in the field of view are capable of identifying the beam position with suitable resolution, the system typically employing split cell optical sensors and retro-reflectors. Another method is to add vision metrology through the same optical path, employing identifiable features of the object being inspected. In vision metrology applications, the features identified in the field of view are used to recalibrate the analog angular position sensors. Trepanier U.S. Pat. No. 5,400,132 exemplifies the use of retro-reflectors in the field of view. Weisz, U.S. Pat. No. 4,918,284 uses features on the object being viewed, which are inspected for calibration or alignment purposes.

In periodic systems such as those found in most polygon laser printers, the printing plane has installed start-of-scan and end-of-scan split cell optical sensors for pointing and range definition.

An alternative corrective method has been to create an additional optical path, the only purpose of which is for calibration or position definition. Typical of these is the Pell box™ of ECRM and the microscopy scanning system of Tsien U.S. Pat. No. 5,296,703.

It is frequently impractical or impossible to install fiducials in the field of view, for instance in laser guiding systems for rocket firing or satellite communication, and in any event these and other proposals add to cost or inconvenience, and, overall, have not been as effective as is desired.

The subject of this invention is a simple and economical design for a stable capacitive position transducer. Without compromising resolution or size or any other feature, this invention offers sensitivity and null stability over a wide range of conditions, equivalent to the sensor's resolution. An additional feature of the concept is the cost benefits derived from the ability to use ordinary electronic elements in the associated circuitry and to eliminate the need for fiducials in the field of view.

While the invention addresses a particular need related to galvanometric systems and limited rotation motors, the invention can have applicability generally to oscillating systems requiring precise positioning.

SUMMARY OF THE INVENTION

An object of this invention is to resolve the difficulties described. This invention aims to offer a simple, self contained and economical capacitive position transducer system able to correct environmental or time-related drift.

A specific object is to improve galvanometric optical scanners from the performance versus cost point of view.

Another object of the invention is to provide, in more general terms, a design and process that corrects gain and null drifts of picofarad position detection systems of variable capacitance position transducers.

Another object of this invention is to teach that fiducial marks can be located as capacitive features of the capacitive transducer proper to act cooperatively with the moving member of the transducer. Such fiducial marks may be provided as features on one or many of the sensing capacitive plates of the transducer or as additional capacitive elements on a common support.

Another object of this invention is to teach that a transducer built with internal fiducial calibration features and working cooperatively with a logic system, such as a personal computer, can effectively minimize drift for both conductive and dielectric moving armatures. The invention is equally applicable to capacitive transducers employed with torque motors having moving iron, moving magnet or moving conductive rotors.

In accordance with a preferred embodiment of the invention, a detection device utilizes a capacitance sensor structure comprising stationary capacitor plate members. Preferably a set of arc-segment capacitor plate sensing elements is disposed on a support plate, the set encircling the rotating shaft of a motor, and a ring-shaped capacitive plate excitation member which also encircles the rotating shaft is spaced a slight distance from the arc-segments along the axis of the shaft, to define a gap. A dielectric or conductive armature (i.e. moving element), having at least a pair of oppositely disposed arms, is fixed to the rotating shaft between the capacitor plate members so that the capacitance structure effectively provides a pair of capacitances having capacitance values which vary in opposite directions as the shaft and attached armature rotate. Circuitry which includes these capacitances is used to determine the capacitance difference, to produce an output signal which represents the angular position of the rotating shaft. The linearity of the signal with respect to the shaft angular position is strongly dependent upon the fact that the arcuate capacitive plate segments are symmetrically identical and preferably segmented, contained within concentric arcs. Furthermore, high repeatability is readily achievable, and is frequently sufficient, since non-linearity can be calibrated and corrected with suitable software programming.

Such a capacitance sensing structure produces a substantially linear signal with respect to angular rotation. The device and in particular the capacitors of the structure which form the capacitances are arranged so that the device is essentially insensitive to radial motions of the rotary shaft.

The transducer of the invention adds capacitive features to such a capacitance sensing structure, that serve as internal fiducials, i.e., angular position references, which are built into the structure of the transducer plates, either as identifiable features of the capacitive arc-shaped sensing segments or as an additional set of capacitive plates located for the purpose of sensing the presence of a mating feature on the moving transducing element. These features can be designed so that the inertia of the moving transducing element increases only minimally when compared with equivalent prior art designs.

The fiducial features can be disposed beyond the central range of deflection used in normal operation, and may be visited only during a calibration mode of the instrument.

In a transducer constructed with independent additional fiducial capacitive sensing segments, the segments are located in proximity to the arc-shaped sensing segments. The fiducial segments interact with a feature of the moving element of the transducer for the purpose of identifying a position, while the main body of the moving element interacts with the sensing segments. Preferably two fiducial segments are located to identify, respectively, clockwise (CW) and counter clockwise (CCW) position with reference to the center position of the transducer.

In a transducer constructed with an internal fiducial reference shaped as a discrete partial narrow radial cut or other perturbation of the geometry of one of the four arcuate capacitive plates, no special features on the moving element are required. It can be shown that if the moving element is made to rotate at nearly constant speed over this cut or perturbation, a proportionally narrow spike will record on the position signal as well as on the drive current and the error signal of the servo amplifier. These spikes are accurate representations of the location of the cuts or perturbations with respect to the capacitive plate and therefore can serve as the anchoring feature of the scanner.

If a second symmetrically similar cut or perturbation of the geometry is created on a symmetrical arcuate capacitive plate of opposite polarity, a similar spike will result when the dielectric member is made to rotate similarly but in the opposite direction.

With the angular distance of these fiducial features known, by measuring the difference of voltage of the signal just between the signal spikes as they first appear, it is then possible, at any time, to determine the angular sensitivity of the transducer. A calibration or recalibration protocol is readily defined to ensure drift-free gain sensitivity of the transducer. An operator or a computer program can implement this protocol. This sensitivity measurement is independent of any environmental perturbations of the electronic circuit used and can be readily repeated as needed. If the plate supporting the arcuate segments is formed of material which deforms in an isotropic manner in response to environmental change, the angular relation between the two internal fiducials is maintained as well as is their relation to a mount anchoring them to a frame of reference. Consequently the transducer preserves its ability to provide its gain stability.

The center position of the angular detector (also known as null or zero position) is normally defined as the mid-point between two approximately symmetrically located, designated angular references determined within the field of view/mechanical range of the scanner/position transducer. A DC bias signal is added to the detected signal such that at these two angular positions, the output of the electronics of the transducer has equal value and opposite polarity. The armature of the transducer is rotated until the output is zero and that position is defined as the null of the instrument. This position should approximately coincide with the axis of symmetry of the plate geometry of the position transducer. The null drift of the prior art transducers is commonly caused by uncontrolled gain drift as the reference positions do not actually exist. Heretofore, the null drift has been nearly totally eliminated when special provisions (which may be costly or inconvenient) have been made for scanners to operate with optical fiducial references installed in the optical field of view. Transducers according to the present invention, with simple and inexpensive internal capacitive fiducials, exhibit the same property, the null position being defined with reference to the two internal fiducials.

BRIEF DESCRIPTION OF THE DRAWINGS

Preferred embodiments of the invention are shown in the drawings wherein.

DESCRIPTION OF THE PREFERRED EMBODIMENTS

Figure 1:
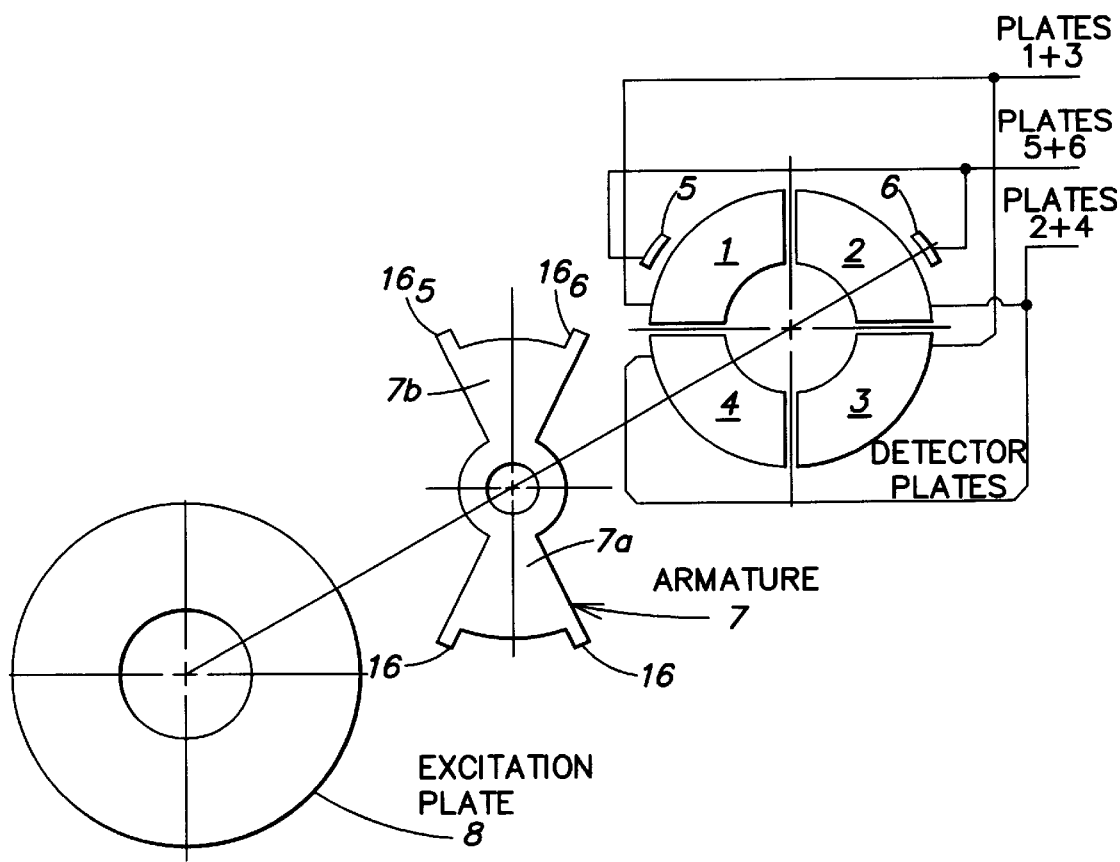
FIGS. 1 and 1A show an exploded view and a simplified side cross-sectional view, respectively, of an embodiment of the invention configured with two discrete fiducial capacitive plates.
Figure 1A:
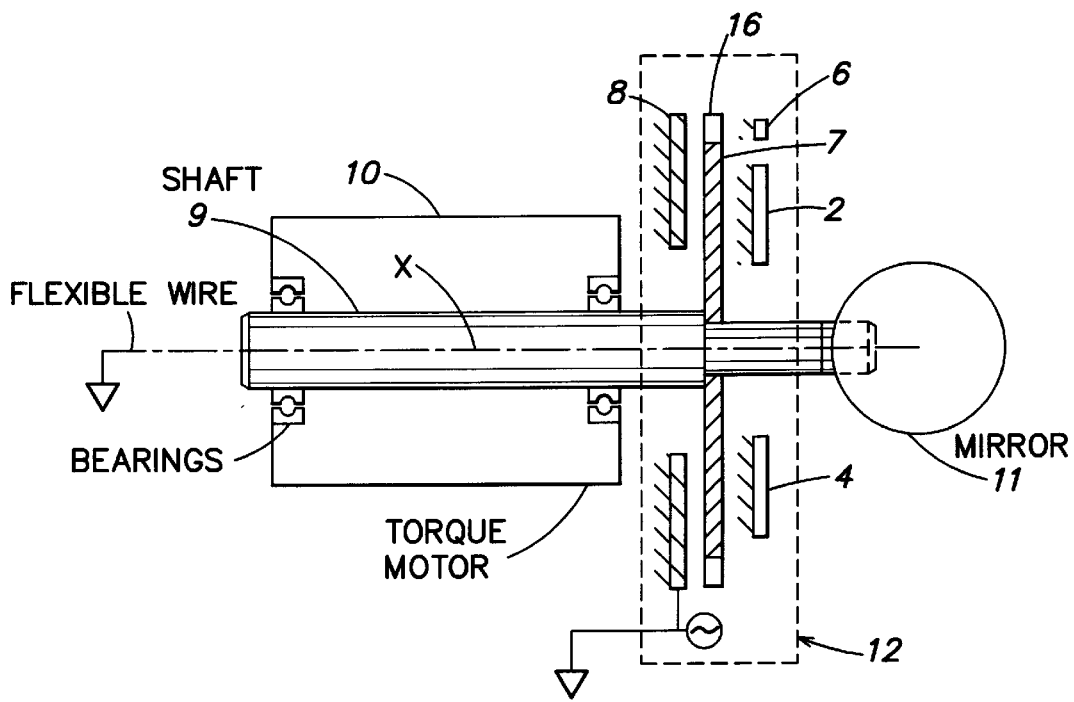
Figure 1B:
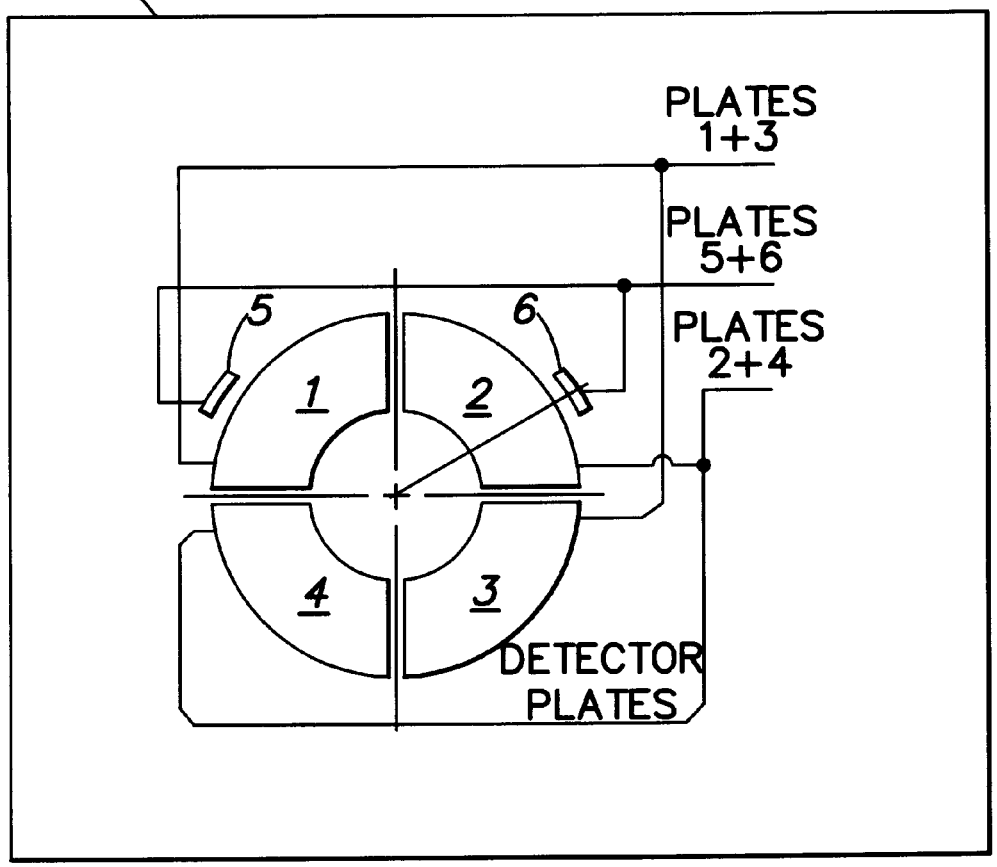
FIG. 1B is a plan view of the isotropic plate which supports the fiducial capacitive plates and arc-segment sensing plates of the transducer.

In the preferred embodiment, FIGS. 1, 1A, 1B and 2, the magnetic, limited excursion torque motor 10 can be of any design. Its rotor includes shaft 9 which rotates in oscillatory fashion about axis X. An extension of the rotor shaft passes through position transducer 12, and mounts on its end an optical device, such as mirror 11.

The position transducer 12 includes, at a plane perpendicular to shaft 9, a stationary support plate 14, preferably of isotropic material, such as isotropic epoxy, PCB or ceramic on which is mounted a set of four capacitor sensor plate elements, 1, 2, 3, 4. Each is of arc-segment form of slightly less than 90 degree extent. The set is arranged to encircle the rotating shaft 9 with insulative space between neighboring plates. Spaced from and parallel to plate 14, opposed to capacitive plate elements 1, 2, 3, 4, is a stationary annular ring capacitive plate member 8 which also encircles shaft 9. It is connected to a voltage source, as indicated, and serves as the excitation plate in the manner common to this type of transducer.

An armature 7 of conductive or dielectric material has oppositely disposed arms 7A and 7B. It is fixed to shaft 9 between capacitive plate members 1, 2, 3, and 4 and the excitation plate 8, and interacts with these plates in the manner usual to capacitive transducers.

The structure effectively provides a pair of capacitances $C_{1,3}$ and $C_{2,4}$ which vary in opposite direction as shaft 9 with armature 7 rotates. Circuitry, as described below with reference to FIGS. 1B and 3, includes those capacitances, and is used effectively to determine the capacitance difference $(C_{1,3}-C_{2,4})$ to produce an amplified analog output signal which represents the angular position of the shaft.

The armature 7 has peripheral, corner tip portions 16 which extend radially beyond the extent of plates 1, 2, 3 and 4. The tip portions are of low mass, being disposed only on the corners of each of the two arms of the armature, four being employed to maintain balance of the rotating mass. In a cooperative relationship with these tip portions, a set of two fiducial capacitive plates 5, 6 is supported on isotropic support 14, being positioned radially beyond and symmetrically disposed with respect to plates 1 and 2.

Figure 3:
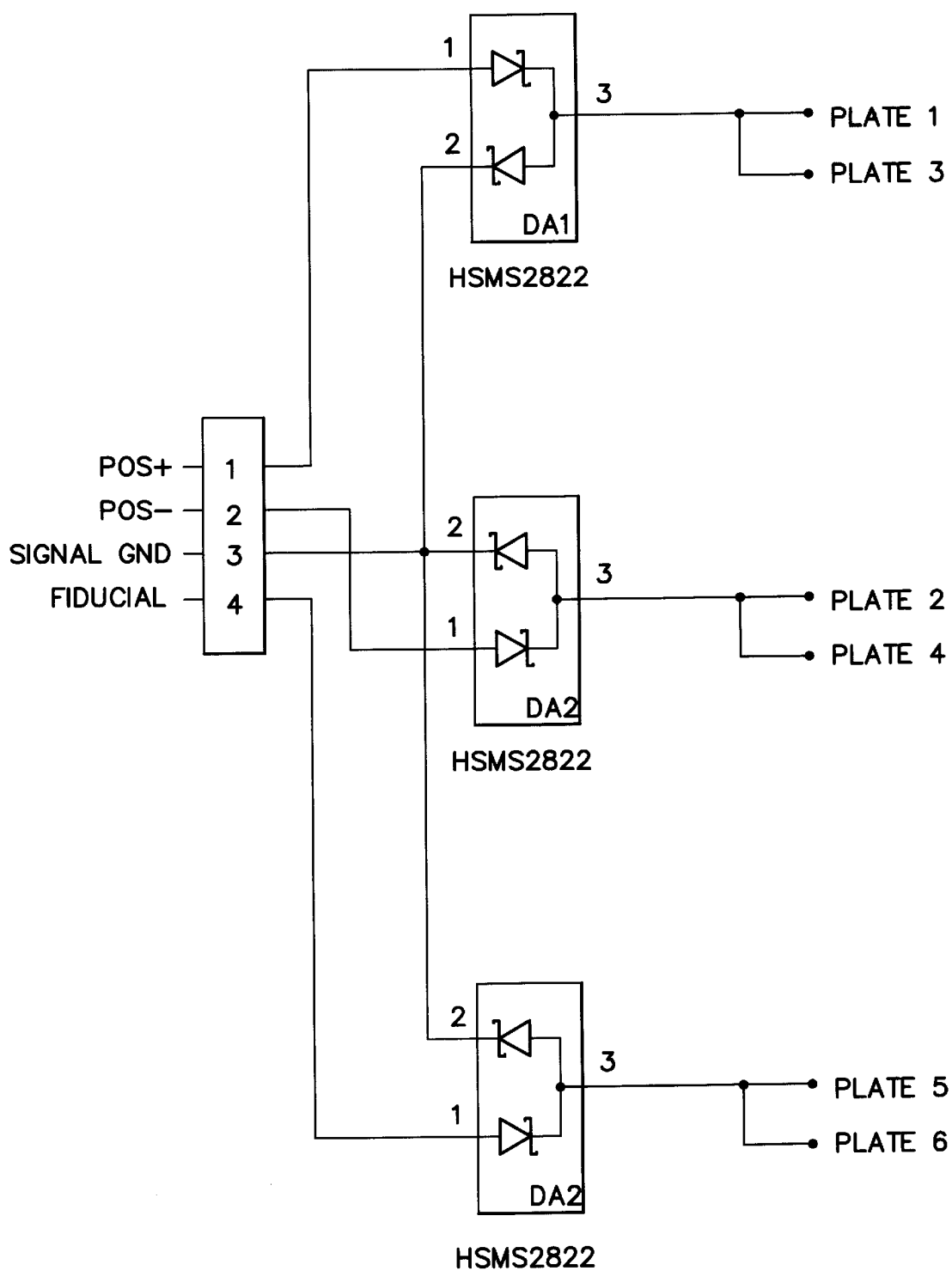
FIG. 3 shows a diagram of a measurement circuit in accordance with an embodiment of the invention.

Fiducial plates 5 and 6 are spaced from each other by angular distance R, FIG. 3, the spacing defining the central operating region of the limited rotation device. Excitation ring 8 preferably is sized to shadow plates 1 to 6.

Figure 2:
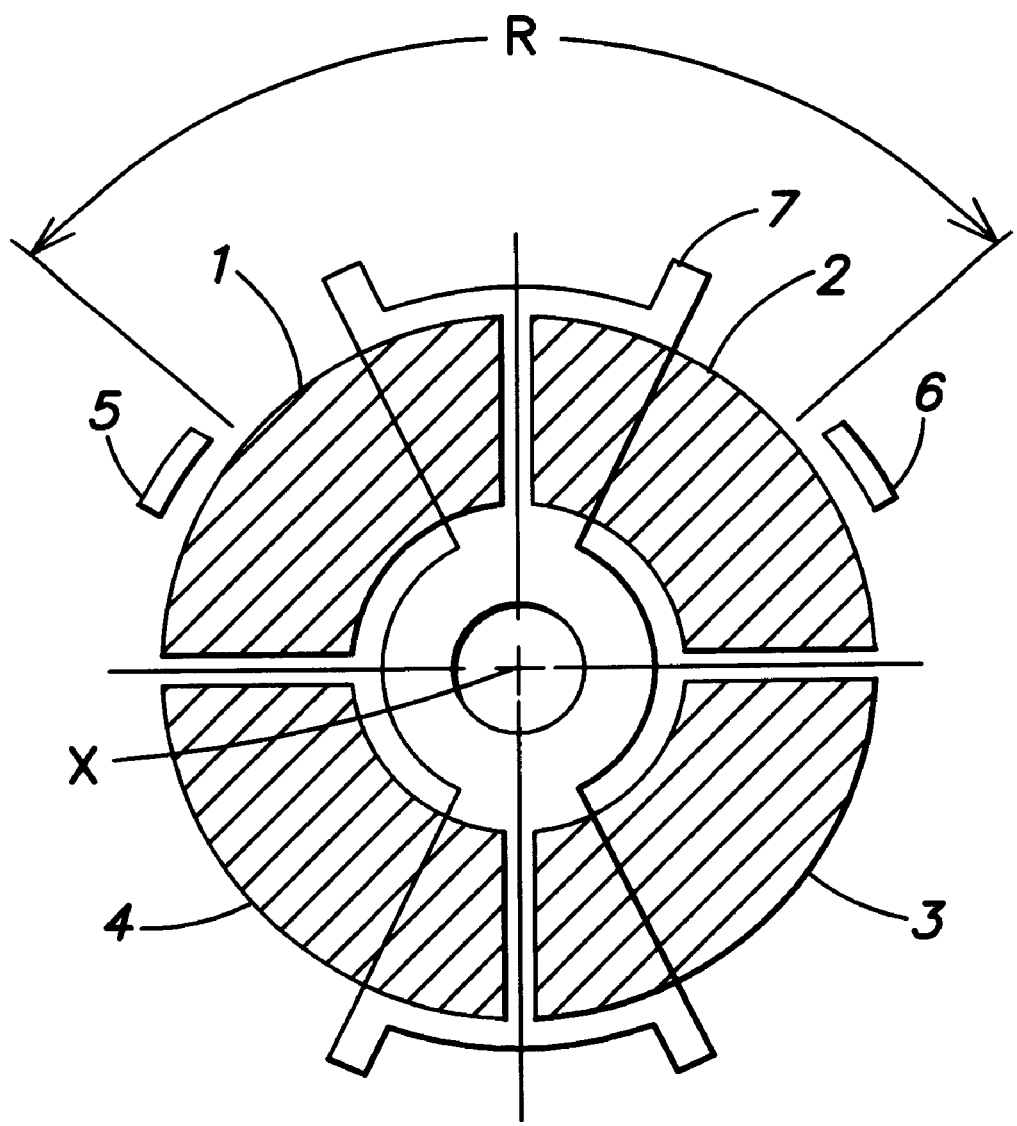
FIG. 2 is a diagrammatic view of a portion of the embodiment of FIGS. 1 and 1A showing the relationship of the armature relative to the two fiducial capacitive plates.

In operation, as the armature 7 rotates within the central region R, so long as its excursions are effectively inside of the fiducial plates 5, 6, see FIG. 2, action of the transducer is equivalent to that of prior art capacitive angular sensing transducers. With further rotation, as may be produced during an elective or periodically automated "calibrate" mode, as the armature 7 reaches the fiducials, 5, 6, the capacitive value associated with these plates experiences an extremely large change as the dielectric within the gap in the vicinity of the tip portions of the armature changes from air to the substance of the armature. The magnitude of change of the capacitive value exhibited by the fiducial is similar to that of the transducer's main plates. It is essentially proportional to the change of the dielectric within the gap of the fiducial.

The fiducials thus determine an angle. Due to selection of an isotropic substance for support 14, the angle remains constant as thermal expansion does not alter angular relations of surface features on such materials.

Figure 4:
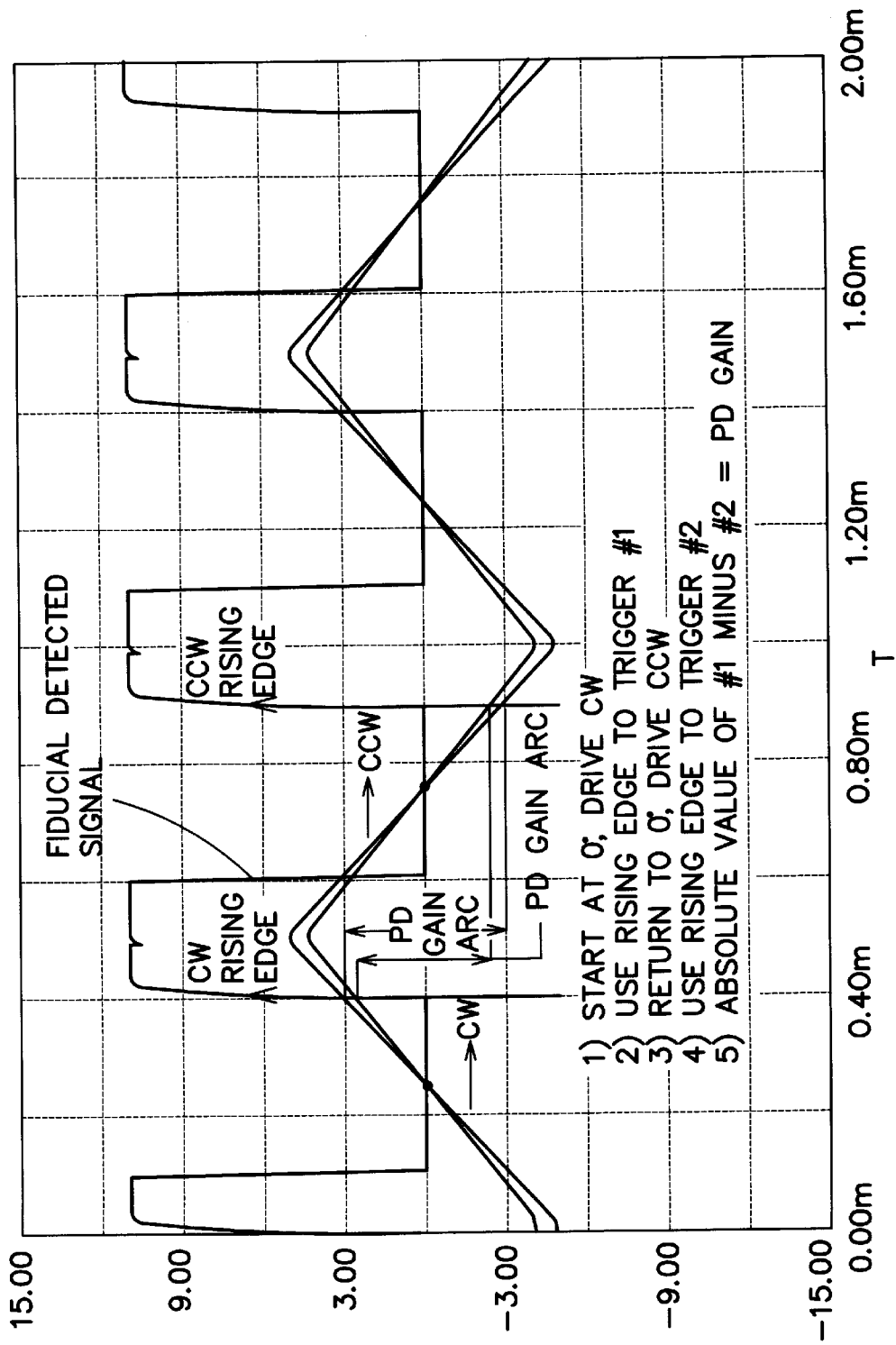
FIG. 4 is a representation of the signal from the position transducer (two examples) and signals from the fiducial detector as the armature is driven by a triangular wave form using the circuit shown in FIG. 4A.

As a tip portion $16_5$ or $16_6$ of the armature reaches and interacts with the respective fiducial plate 5 or 6, the electronic circuit responds with a sharp pulse which identifies the event, see FIG. 4. The rising edge of that pulse is used as an instantaneous indication of true position for that side of the excursion of the armature.

Figure 4A:
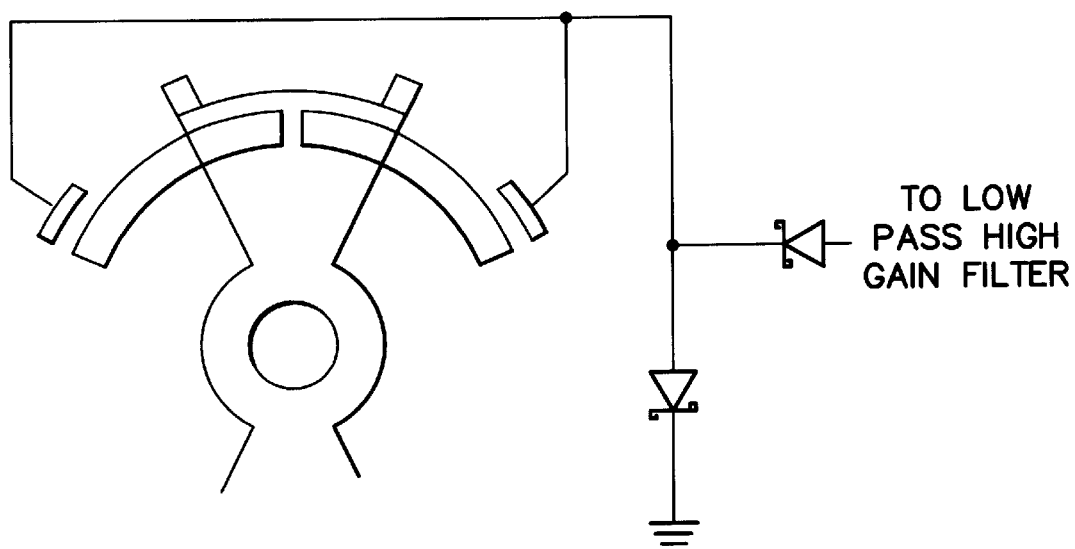
Figure 8:
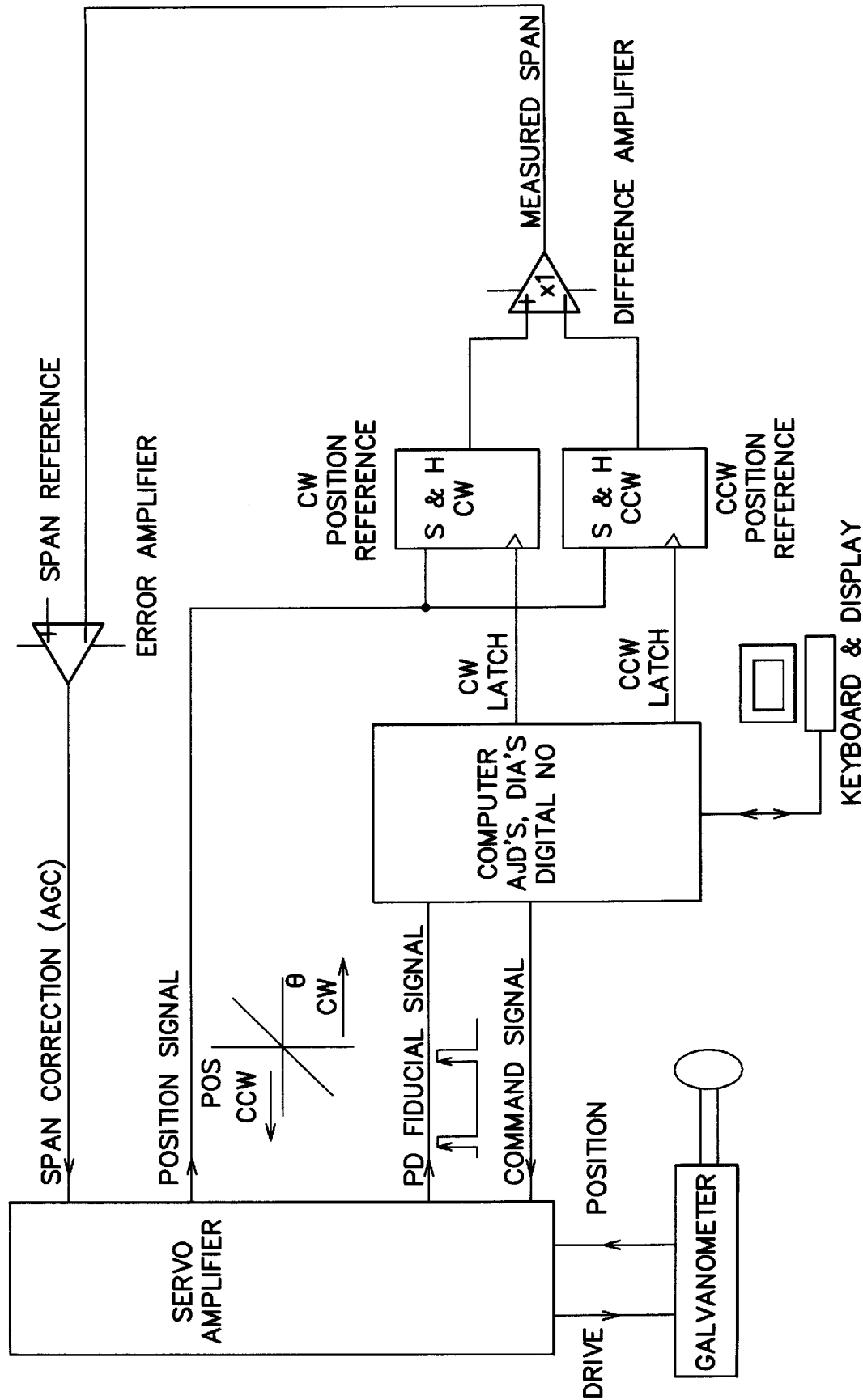
FIG. 8 is a schematic diagram of a drive amplifier with gain and null adjustments and the associated computer.
Figure 9A:
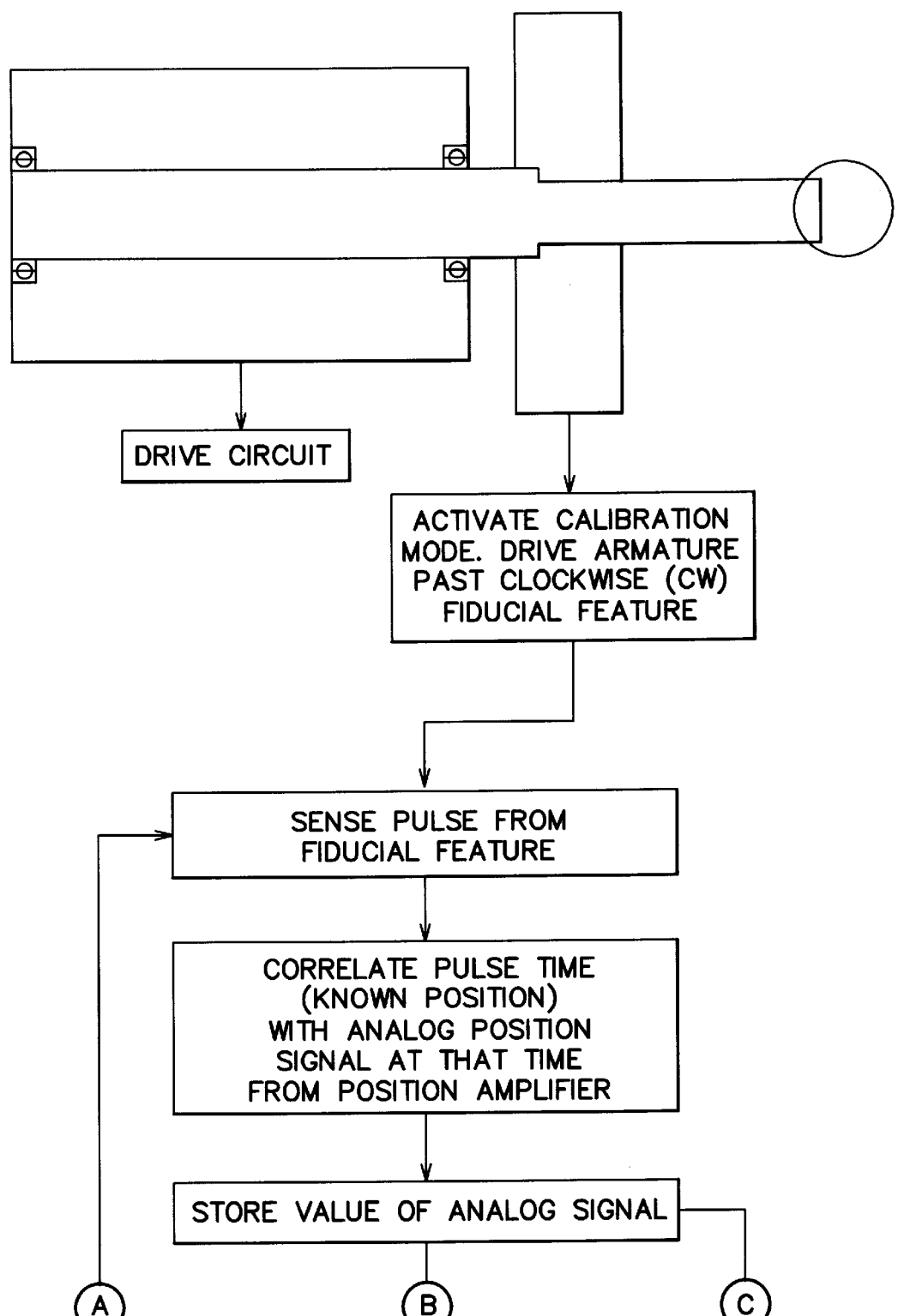
FIGS. 9A and 9B are a symbolic presentation of a software program used to calibrate gain and center position of the armature with respect to the fiducial signals.
Figure 9B:
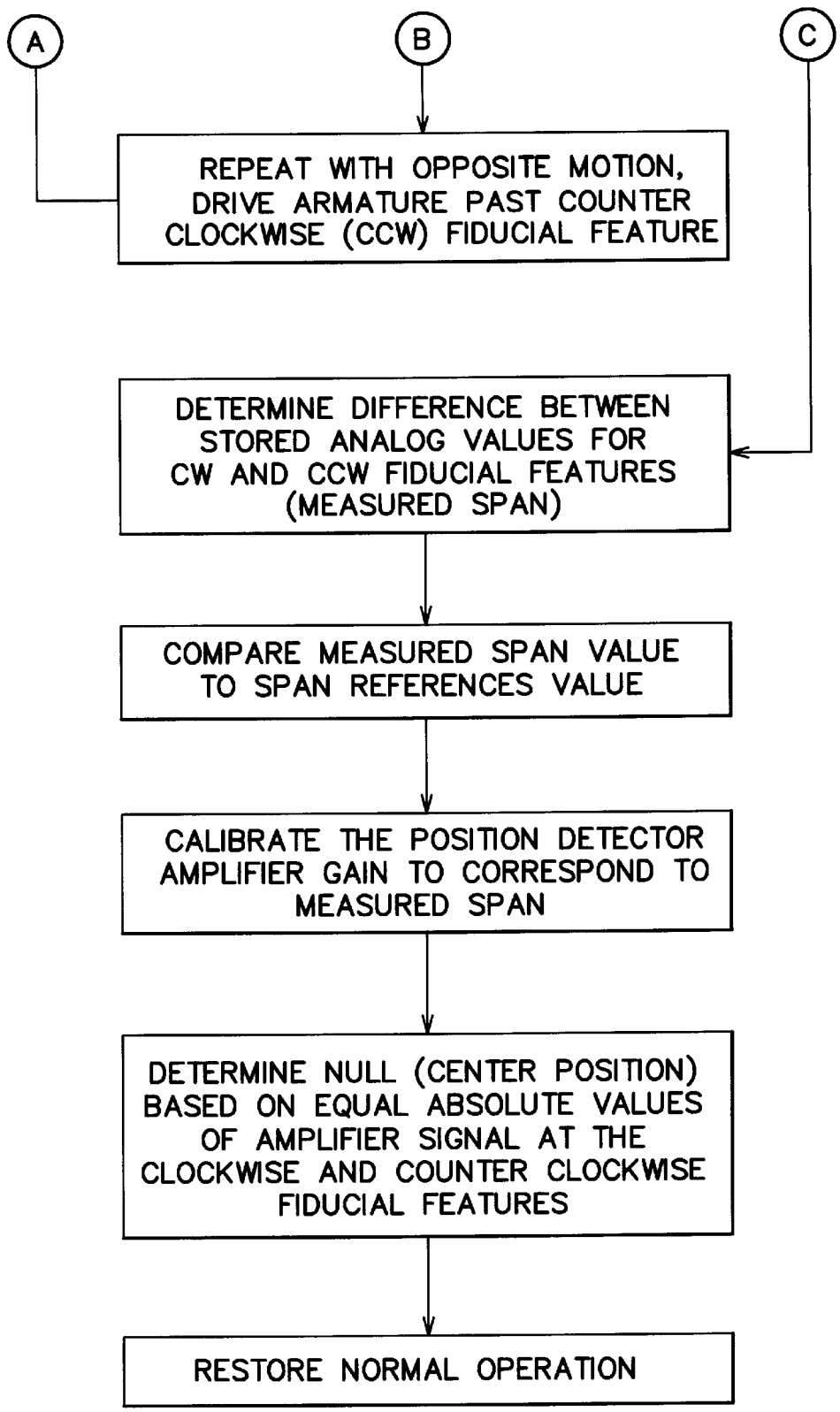

The process is performed for CW and CCW, directions of rotation of the armature, using the circuit of FIGS. 3 and 4a and the techniques shown in FIGS. 4, 8 and 9. A voltage from the position transducer section of the sensor is derived. This value corresponds to the timing signals derived from the leading edges, preferably, of the spike signals from the fiducial plate sensors that represent the extent of the angular excursion of the armature between the two internal fiducials.

The value of that voltage is then compared to a previously established value and corrective action may be taken if necessary. Corrective action can be to alter the gain of the drive amplifier of the limited rotation motor, to force the actual excursion of its shaft and the attached armature, as measured by the transducer, to match the expected value.

In a similar manner, the null position of the armature is determined by adjustments to cause the absolute value of the transducer signals to be equal as the armature reaches and interacts with the two CW & CCW fiducials, 5, 6.

For an example in more detail, referring to FIGS. 4, 8 and 9, the servo control of motor 10 receives, in the usual manner, an amplified analog position signal from the sensing plates 1, 3 and 2, 4 to report to the control system the instantaneous angular position of shaft 9 of the motor. With change in ambient conditions, drift of the position detection system may occur, such that, based upon the reference then being used by the position detection system, the reported analog position signal does not correspond to true position of the armature.

In FIG. 4, amplitude of the position signal is plotted against time, on which is overlayed the fiducial pulse signals. According to the invention, the pulses produced by the capacitive fiducial features with clockwise and counter-clockwise rotation, shown in FIG. 4, provide true instantaneous positions of the armature at the instants of time at which the pulses occur.

In a preferred embodiment, these pulses are used to produce an automatic gain control signal for the transducer amplifier, so that reported position signals are corrected to accurately reflect true shaft position, thus to enable the servo to drive the shaft correctly in response to the command signals.

In the preferred embodiment of FIG. 8, the leading edges of the fiducial pulses, produced with respective clockwise and counterclockwise rotation of shaft 9, are employed as triggers (latch signals) for respective sample and hold (S&H) circuits. Under computer control, the instantaneous value of the analog position signal is sampled at the occurrence of the leading edges of the clockwise and counterclockwise fiducial pulses. The difference in these sampled values ("measured span" in FIG. 8) represents the total position amplifier gain for the defined span of armature angular displacement R between the two physically located fiducial features. FIG. 4 shows two different position detector gain settings, and how the difference in the sampled values, that correspond to the intersection of the pulses with the gain curves, produces respectively different total gain values, PD Gains 1 and 2.

The values of the two samples and hold circuits are compared to produce a difference value that represents the true, measured span between the fiducial features; this value, in turn, is compared to the "span reference" in FIG. 8, the reference value previously used by the system as representing the span distance. This produces an error signal "span correction (AGC)", that is then applied as an automatic gain correction signal, to bring into conformity the gain of the transducer amplifier, so that reported position will conform to actual position.

For null correction, by simple circuitry not shown, the sample and hold values taken at the two fiducials are averaged, to produce the desired absolute position value that should be detected at each fiducial. This desired position value is compared to the actual values at the fiducials, and a corresponding adjustment is made to the null of the position amplifier system, so that the desired value will occur.

Instead of making these corrections on the basis of one or a few samplings, which is possible in certain cases, it is advantageous in other cases to arrange the system to make the corrections gradually in small increments on an iterative basis to converge on accurate calibration values despite the fiducial features being located in regions beyond the linear range of operation of the limited rotation motor.

Figure 5:
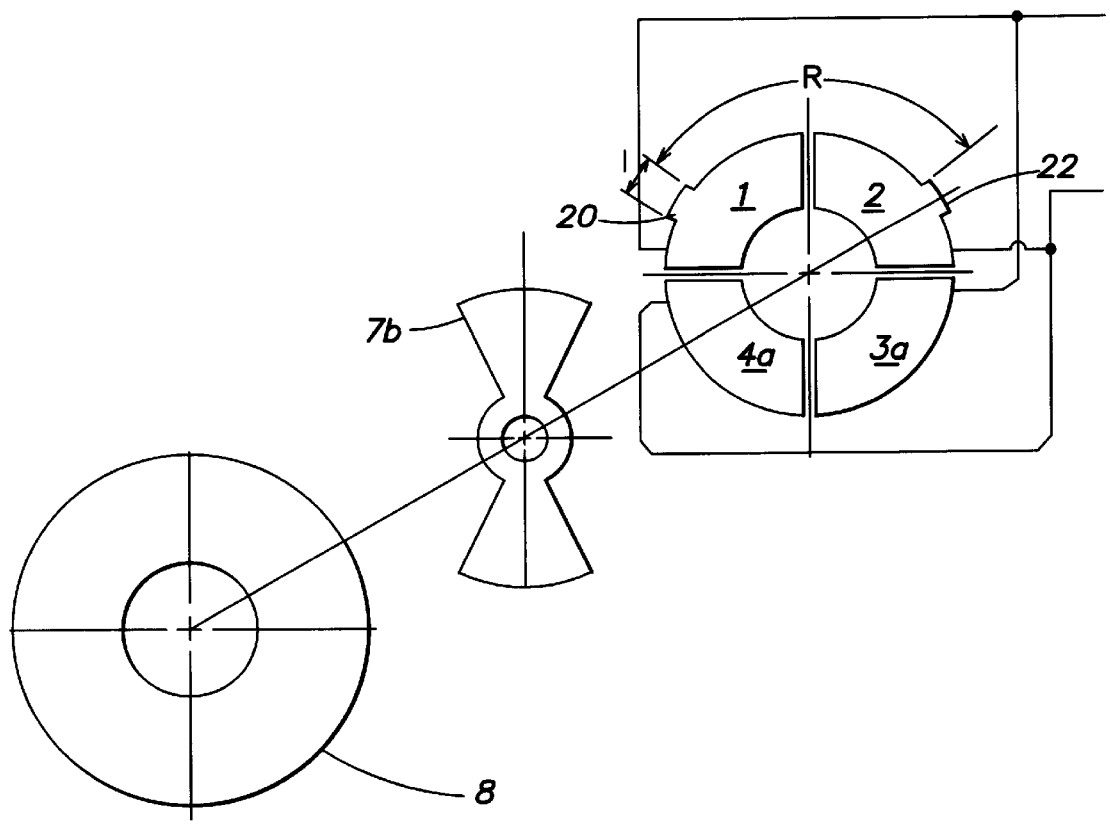
FIG. 5 shows an exploded view, similar to FIG. 1, of an embodiment of the invention configured with protrusions formed in two of the arc-segment capacitive sensing plates.
Figure 6:
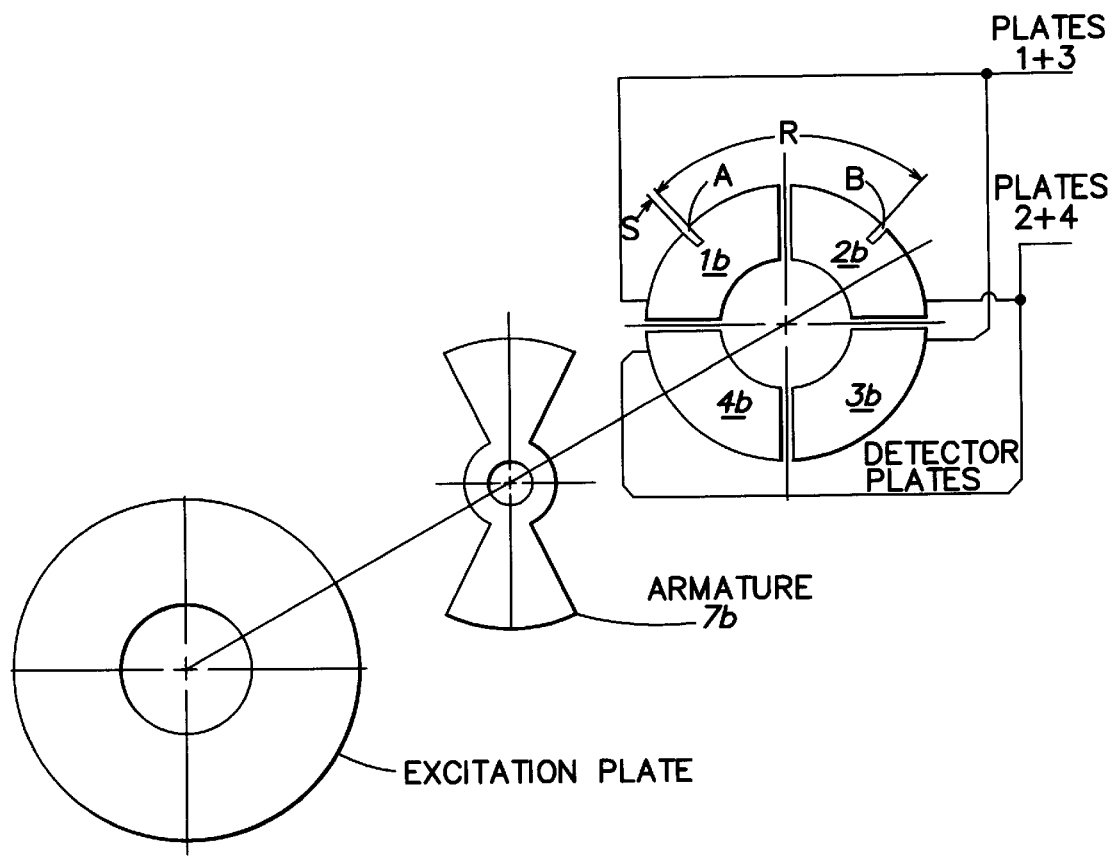
FIGS. 6 and 6A show an alternative transducer design by an exploded view and a side view, respectively, of the invention configured with two slots in the arc-segment capacitive sensing plates.
Figure 6A:
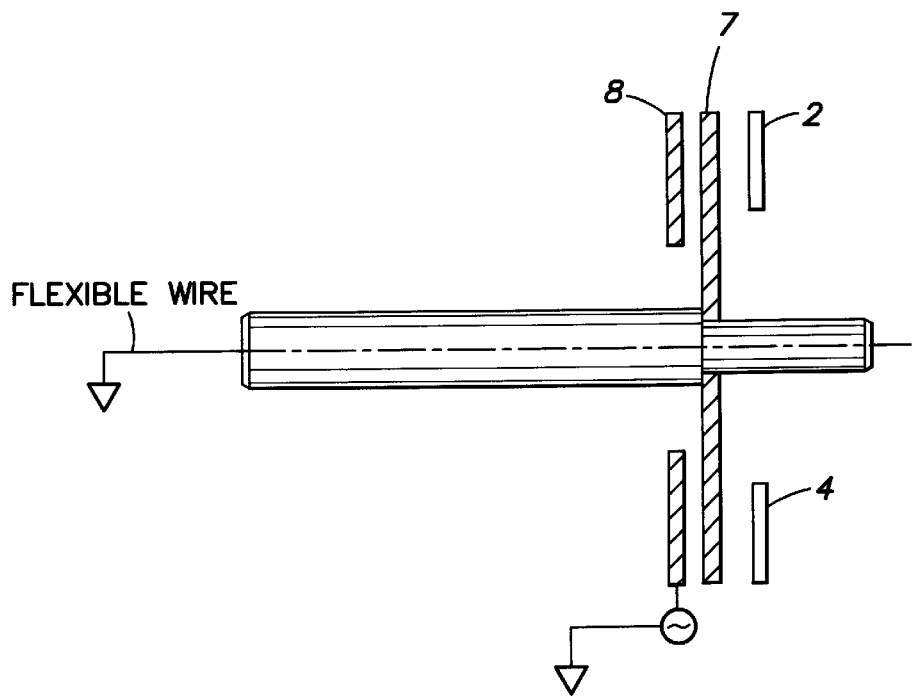

The embodiments of FIGS. 5 and 6 exemplify different means of obtaining capacitive fiducial signals. Both designs derive a fiducial signal by introducing a sharp discontinuity in the geometry of the capacitive sensing plates of the transducer. The fiducial discontinuities are normally located outside the linear and useable range of the transducer.

In the embodiment of FIG. 5, the perturbations of the geometry of capacitor plate elements 1a and 2a are in the form of radially enlarged tab portions 20 and 22, respectively.

These are spaced apart arc distance R, the spacing defining the central operating region of the armature. Armature 7a with its associated torque motor's inertia and load, are actuated to rotate at constant speed such as to follow a high frequency triangular signal. When armature 7a reaches the enlarged tabs 20 and 22, it is effective in cooperation with the excitation plate 8a and the respective fiducial tab, to produce a discontinuity in the signal detected from the respective sensor plate 1a or 2a. The servo driver reacts to that discontinuity and a current spike is generated to force the rotor to track the signal.

In the embodiment of FIG. 6 perturbations of the geometry of capacitor plate elements 1b and 2b are in the form of limited radial slots A and B cut in the peripheral portions of the respective sensor plates.

Figure 7:
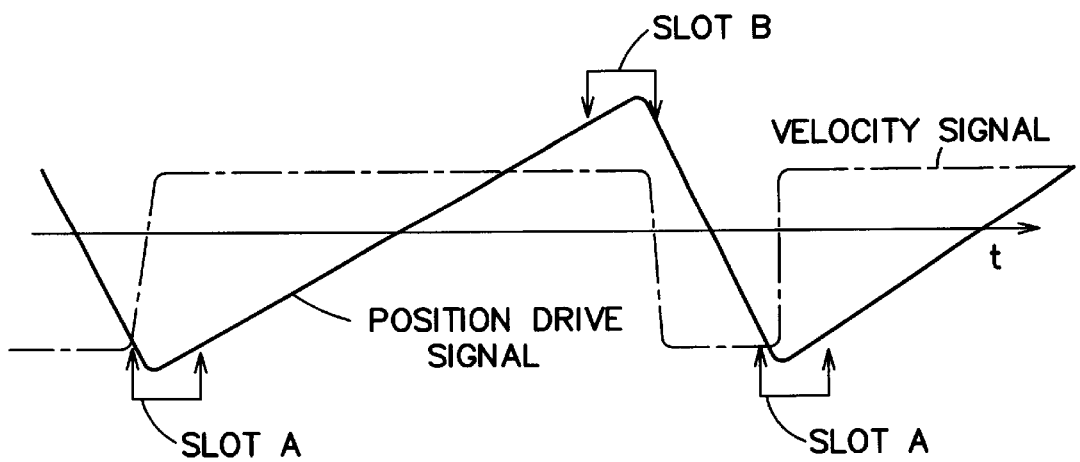
FIG. 7 is a representation of the signal from the transducer as well as fiducial detection signals with the armature traveling at constant speed over the internal fiducial marks and FIG. 7A shows the drive current responding to the effects of the fiducial slots.
Figure 7A:
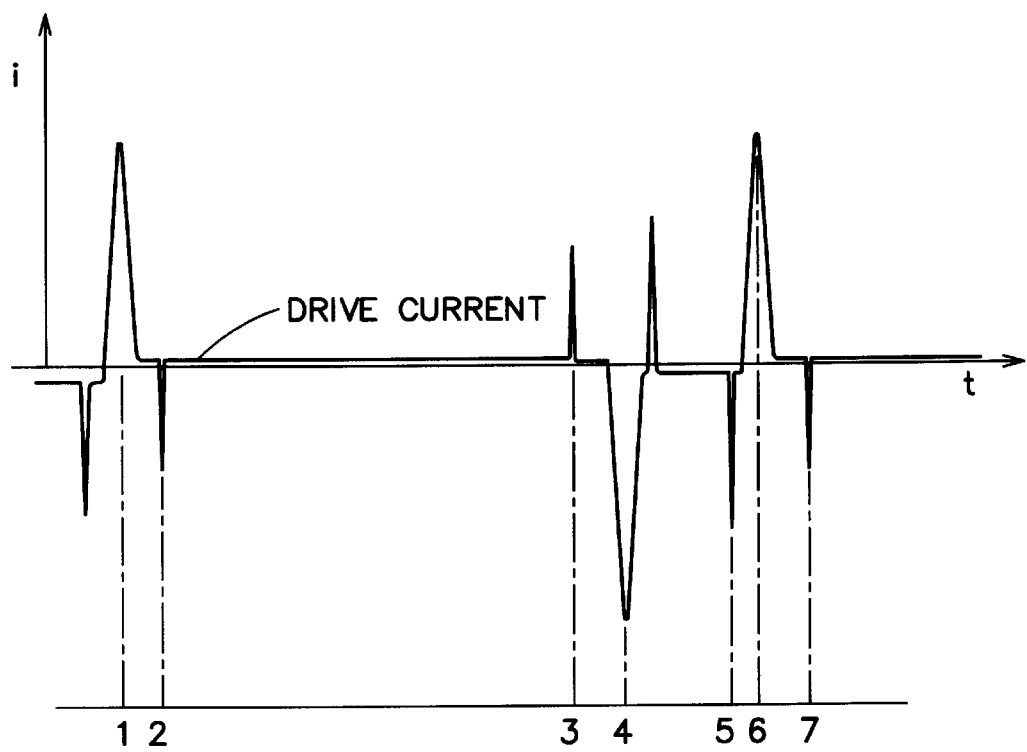

When the rotor is driven as described above, the effect of a perturbation in the geometry of the capacitive sensing plates is shown in FIGS. 7 and 7A with respect to the embodiment of FIG. 6.

When the armature 7b of the transducer, with its associated load and torque motor inertia, is driven as a servo system as shown in FIG. 8, the current forcing the torque motor, i.e. galvanometer 10, will reflect any sharp change or discontinuity of the error signal, i.e. the difference between the position drive signal (command signal received from the computer) and the detected position signal from the transducer. In this embodiment of the invention, a discontinuity of the error signal is caused by the discontinuity of the geometry of the capacitive sensing plate of the position transducer.

When the position drive signal is a saw tooth, during the linear portion of the motion, the required torque and associated drive current are very small as shown in FIG. 7. When the fiducial discontinuity occurs, a sharp "error" signal is produced, and in response the servo sends a large current pulse to attempt to restore tracking condition. These current pulses are shown on FIG. 7A and can be derived with suitable logic, as fiducial signals for gain and null correction, as described above.

In most cases the shaft and armature in normal operation of the limited motion device stay within the range defined between a pair of fiducials. In the case of a limited rotation motor, this is the angular range R of the figures. A separate calibration mode is employed to apply a drive signal that causes the armature's excursion to reach the fiducials to produce the pulses at times to be related to the drive signal. Such a calibration mode can be enforced by computer control repeatedly after a given period of operation or upon the occurrence of a given detected event. There can, however, be circumstances in which it is advantageous for the instrument to have its normal excursions larger than those in which useful work is performed by the limited rotation device, so that the instrument automatically calibrates even with each excursion.

What is claimed is:

1. A capacitive position detector comprising a fixed structure comprising an energizing plate and opposed thereto, separated by a gap, at least one sensing plate, and an armature movable in the gap dependently with the motion of an element the position of which is to be sensed, the armature constructed to alter the capacitive coupling between the energizing and sensing plates dependently with its change in position, and at least one capacitive fiducial feature located in a known position substantially opposed to the energizing plate, the position being disposed at a predetermined point along the path of travel of the armature, the fiducial feature so arranged to produce a discrete signal at the time when the armature reaches and interacts with it, thereby to signal a precise location of the armature relative to the fixed structure.

2. The position detector of claim 1 in combination with a limited rotation motor having a shaft element the angular position of which is to be sensed.

3. The position detector of claim 2 comprising a galvanometric optical scanner.

4. The position detector of any of the preceding claims in which the fiducial feature comprises a discrete capacitor fiducial plate, arranged to produce a position signal which is independent of signal derived from said sensing plate.

5. The position detector of claim 4 in which the energizing plate is an annular ring encircling a shaft that comprises the element the rotary position of which is to be sensed, there is a set of arc-segment sensing plates encircling the shaft, the fiducial feature comprises a discrete fiducial capacitive plate located radially outward from said arc-segment sensing plates, and the armature has a portion extending radially sufficiently to interact with the fiducial plate.

6. The position detector of claim 5 wherein said set of plates comprises four substantially identical plates arranged in a circle, the first and third of which and the second and fourth of which are electrically connected, the armature having two opposed arms which correspondingly overlap the first and second and the third and fourth sensing plates, respectively, there being at least two fiducial features respectively associated with the first or third and the second or fourth sensing plate; the armature having tip extensions that extend radially beyond the extent of said plates to interact with the fiducial plates in regions displaced angularly, beyond the maximum normal operational excursion of the shaft respectively with respect to counterclockwise and clockwise rotation.

7. The position detector of claim 6 in combination with circuitry constructed and arranged to respond to pulses originating at said fiducial plates to correct gain or null drift of a driver for the shaft.

8. The position detector of claim 14 in which the sensing plates and the fiducial plate are supported on isotropic material in the manner that the angular location of the fiducial plate and the sensing plates do not change with respect to each other with change in ambient conditions.

9. The position detector of claim 4 in combination with circuitry constructed and arranged to respond to pulses originating at said fiducial plate when correcting gain or null drift of a driver for the element the position of which is sensed.

10. The position detector of any of the preceding claim 1, 2 or 3 in which the fiducial feature is formed by a perturbation in said sensing plate to produce a position signal superposed on the signal derived from the main body of said sensing plate.

11. The position detector of claim 10 in which the perturbation comprises a discrete radial enlargement of the sensor plate.

12. The position detector of claim 10 in which the perturbation is a partial radial slot formed in the sensing plate.

13. The position detector of claim 10 in which the energizing plate is an annular ring encircling a shaft that comprises the element the rotary position of which is to be sensed and there is a set of arc-segment sensing plates encircling the shaft at least one of which has said perturbation.

14. The position detector of claim 13 wherein said set of plates comprises four substantially identical plates arranged in a circle, the first and third of which and the second and fourth of which are electrically connected, the armature having two opposed arms which correspondingly overlap the first and second and the third and fourth sensing plates, there being at least two fiducial features associated with the first or third and the second or fourth sensing plate, respectively.

15. The position detector of claim 14 in combination with circuitry constructed and arranged to respond to pulses originating at said fiducial feature to correct gain or null drift of a driver for the shaft.

16. The position detector of claim 13 in which the sensing plates are supported on isotropic material in the manner that the angular location of the sensing plates and the fiducial feature do not change with respect to each other with change in ambient conditions.

17. The position detector of claim 10 in combination with circuitry constructed and arranged to respond to pulses originating at said fiducial feature to correct gain or null drift of a driver for the element position of which is sensed.

18. A position transducer comprising a fixed and a movable structure constructed to provide to a measurement circuit an electrical signal corresponding to a position of the movable structure with respect to the fixed structure; said position transducer including at least one internal fiducial calibration feature causing an electrical perturbation signal at a selected position of the movable structure with respect to the fixed structure.

19. The position transducer of claim 18 combined with a limited rotation motor having a moving iron, a moving magnet or moving conductive rotor associated with a shaft, the transducer being of the capacitive type having a rotatable armature, included as part of said movable structure, mounted on the shaft, and the fixed structure including the fiducial calibration feature constructed to have capacitive interaction with the armature.

20. The position transducer of claim 19 in which the transducer comprises said fixed structure including a plurality of arc-segment capacitor sensing plate elements, which encircle the rotating shaft of the motor, and a ring-shaped capacitive excitation plate member which encircles the rotating shaft and is spaced along the axis of the shaft from the arc-segment plate member to form a gap, the armature comprising a member having at least a pair of oppositely disposed arms fixed to the rotating shaft and disposed in the gap between the sensing plate members and the excitation plate member so that the capacitance structure thereby effectively provides a pair of capacitances having capacitance values $C_{1,3}$ and $C_{2,4}$ which vary in opposite directions as the shaft and attached armature member rotate, circuitry including such capacitances to determine the capacitance difference ($C_{1,3}$–$C_{2,4}$) to produce an output signal which represents the angular position of the rotating shaft, the capacitor plate members so arranged that the position transducer is essentially insensitive to radial motions of the rotary shaft, the at least one capacitive fiducial feature including internal angular position fiducial references which are built into the structure of the transducer at selected locations.

21. The position transducer of claim 20 wherein the internal fiducial references are formed by perturbations of the capacitive arc-shaped segments.

22. The position transducer of claim 20 wherein the internal fiducial references comprise an additional set of capacitive plates located to sense the presence of mating features on the moving armature.

23. The position transducer of claim 22 in which the fiducial references are fiducial capacitive segments located in proximity to the arc-segment capacitor sensing segments, in location to interact electrostatically with features of the moving armature to identify position.

24. The position transducer of claim 21, 22 or 23 in which two fiducial segments are located to identify, respectively, clockwise (CW) and counter clockwise (CCW) positions with reference to the center position of the transducer.

25. The position transducer of claim 21, 22, or 23 in which the material of the support for the arc-segment capacitor sensing segments and the fiducial feature is selected to deform in an isotropic manner, whereby the angular relation between internal fiducial references is maintained as well as is their relation to a mount anchoring said fiducial references to a frame of reference, whereby the transducer preserves its ability to provide its gain stability over a range of changes of ambient conditions.

26. The position transducer of claim 21, 22 or 23 including circuitry to measure the difference of voltage of the signal just as said electrical perturbation signals associated respectively with the fiducial references first appear, to determine the angular sensitivity of the transducer.

27. The position transducer of claim 26 constructed to implement a calibration or re-calibration protocol to ensure drift-free gain sensitivity of the transducer.

28. The position transducer of claim 27 constructed to add a DC bias signal to a detected signal such that, at two angular positions of the angular position fiducial references, the output of the electronics of the transducer has equal value and opposite polarity.

29. The position transducer of claim 26 constructed to define the center position of the angular detector i.e. null or zero position as the mid-point between two approximately symmetrically located internal fiducial features.

30. The position transducer of claim 21 wherein the internal fiducial references are shaped as partial narrow radial cuts or other perturbations of the geometry of one of the four arcuate capacitive sensing plates.

31. The position transducer of claim 30 constructed to cause the armature member to rotate at nearly constant speed over one of the cuts or other perturbations to produce a proportionally narrow spike superimposed on the position signal or the drive current or the error signal of a servo amplifier, the spike representing the location of the cut or other perturbation with respect to the fixed transducer structure, to serve as a fixed reference of the apparatus.

32. The position transducer of claim 30 having a second symmetrically similar cut or other perturbation of the geometry on a symmetrical arcuate capacitive sensor plate of opposite polarity, to produce a similar spike when the armature member is made to rotate similarly but in the opposite direction.

33. A method of determining a center position of a transducer comprising the acts of:

providing a fixed and a movable structure constructed to provide to a measurement circuit an electrical signal corresponding to a position of said movable structure relative to said fixed structure; said fixed structure including two internal fiducial calibration features causing, with respect to said movable structure, electrical perturbation signals received by the measurement circuit;

displacing said movable structure;

determining position signals based on said electrical signal corresponding to a position of said movable structure relative to said fixed structure;

detecting said electrical perturbation signals caused by said two internal fiducial calibration features; and defining the center or null position, the position being defined with reference to positions of said two internal fiducial features.

34. The method of claim 33 wherein said fixed structure comprises an energizing plate and opposed thereto, separated by a gap, at least one sensing plate and said fiducial calibration features, said movable structure comprises an armature movable in the gap dependently with the motion of an element the position of which is to be sensed, the armature being constructed to alter the capacitive coupling between the energizing and sensing plates dependently with its change in position, said displacing act includes producing said perturbation signals at the time when the armature reaches and interacts with said two internal fiducial calibration features.

35. The method of claim 34 wherein said defining includes measuring a difference of position signals at the perturbation signals associated respectively with the fiducial reference to determine angular sensitivity of the transducer.

36. A method of calibrating a position transducer comprising the acts of:

providing a fixed and a movable structure constructed to provide to a measurement circuit an electrical signal corresponding to a position of said movable structure; said position transducer including at least one internal fiducial calibration feature causing an electrical perturbation signal at a selected position of the movable structure with respect to the fixed structure;

displacing said movable structure;

determining position signals based on said electrical signal corresponding to a position of said movable structure relative to said fixed structure;

detecting said electrical perturbation signal caused by said at least one internal fiducial calibration feature; and calibrating said position transducer.

37. The method of claim 36 wherein said fixed structure comprises an energizing plate and opposed thereto, separated by a gap, at least one sensing plate and said fiducial calibration feature formed by two angular position fiducial references; said movable structure comprises an armature rotatable in the gap dependently with a rotation of a measured element, the armature being constructed to alter the capacitive coupling between the energizing and sensing plates dependently with the armature's change in position, said displacing act includes producing said perturbation signals at the time when the armature rotates to reach and interact with said two internal fiducial calibration features.

38. The method of claim 37 wherein said calibrating act includes measuring the difference between said position signals when said electrical perturbation signals associated respectively with the fiducial references are detected to calibrate a position gain of the transducer.

39. The method of claim 38 wherein said calibrating act includes a center position of the position transducer.

* * * * *